United States Patent
Knaak et al.

(10) Patent No.: US 11,904,398 B2
(45) Date of Patent: Feb. 20, 2024

(54) WIRE MANAGEMENT METHOD FOR HIGH-SPEED WIRE CUTTING

(71) Applicant: Agie Charmilles SA, Losone (CH)

(72) Inventors: Reto Knaak, Ascona (CH); Enrico Costi, Vacallo (CH); Roberto Feola, Locarno (CH); Niccolò Ferrazzi, Carabbia (CH)

(73) Assignee: Agie Charmilles SA (CH)

( * ) Notice: Subject to any disclaimer, the term of this patent is extended or adjusted under 35 U.S.C. 154(b) by 295 days.

(21) Appl. No.: 17/365,500

(22) Filed: Jul. 1, 2021

(65) Prior Publication Data

US 2022/0001473 A1    Jan. 6, 2022

(30) Foreign Application Priority Data

Jul. 3, 2020   (EP) ..................................... 20183870

(51) Int. Cl.
*B23H 7/10*    (2006.01)
(52) U.S. Cl.
CPC ............. *B23H 7/105* (2013.01); *B23H 7/104* (2013.01)
(58) Field of Classification Search
None
See application file for complete search history.

(56) References Cited

U.S. PATENT DOCUMENTS

| 4,702,138 A | 10/1987 | Hattori et al. |
| 5,365,030 A * | 11/1994 | Hayakawa ............... B23H 7/10 |
| | | 219/69.12 |
| 2018/0029152 A1 * | 2/2018 | Hasegawa ................ B23H 7/04 |

FOREIGN PATENT DOCUMENTS

| CN | 105195843 B | 4/2017 | |
| JP | 2015217438 A | 12/2015 | |
| WO | WO-2018145549 A1 * | 8/2018 | ............... B23H 7/02 |

OTHER PUBLICATIONS

Machine translation of WO 2018/145,549 A1, Jun. 2023 (Year: 2023).*
Extended European Search Report for Application No. 20183870.3 dated Dec. 8, 2020 (8 pages).
Wang Wei, et al. "Surface burning of high-speed reciprocating wire electrical discharge machining under large culling energy", Int J Adv Manuf Technol, published Apr. 2, 2016 (8 pages).

* cited by examiner

*Primary Examiner* — Geoffrey S Evans
(74) *Attorney, Agent, or Firm* — Harness, Dickey & Pierce, P.L.C.

(57) ABSTRACT

A high-speed reciprocating wire cutting process in which a wire electrode is transported and precisely guided across a machining area by means of a wire traveling circuit, whereas the cutting process is conducted by repeatedly: (a) running the wire electrode in a first direction until a first reciprocation position, (b) stopping and inverting the traveling direction of the wire electrode, (c) running the wire electrode in a second direction until a second reciprocation position, and (d) stopping and inverting the traveling direction of the wire electrode.

13 Claims, 2 Drawing Sheets

WIRE MANAGEMENT METHOD FOR HIGH-SPEED WIRE CUTTING

CROSS-REFERENCE TO RELATED APPLICATIONS

This application claims priority to European Patent Application 20 183 870.3 of Jul. 3, 2020 all of which is incorporated by reference herein.

TECHNICAL FIELD

The invention relates to a method and machine for high-speed wire cutting, in particular an improved wire management method.

BACKGROUND

The method disclosed herein relates to high-speed wire cutting. This electrical cutting method is sometimes called high-speed wire electrochemical-discharge cutting, fast-wire cutting, high-speed reciprocating wire cutting, high-speed WEDM, or simply HS-WEDM or HS-WECDM or FW. In the following it is referred to as High-speed wire cutting process or HS-WECDM. The HS-WECDM process is conducted by applying a pulsed voltage to the gap, in an electrolyte having a certain conductivity, so that the process comprises an electrochemical machining component (dissolution) and an electro-thermal machining component. The wire traveling direction is periodically reciprocated, forth and backwards, so that the wire electrode is used many times. This is possible because of the low wire wearing of negative polarity pulses and by the fact that molybdenum is typically used as wire material. Moreover, the traveling speed of the wire is up to around 20 m/s. The high traveling speed of HS-WECDM drags the machining fluid through the kerf, so that the removed material particles generated while cutting are expelled with said machining fluid.

A HS-WECDM servo control system adjusts the feed rate to ensure a proper and stable discharge gap. The servo control system is based on the process signals measured in the gap, e.g. voltage. The process signals are used to derive a signal error, which serves as a feedback for the control of axis feed speed. However, the machining process is not always steady; under certain conditions the machining slows downs or stops. Reason may be dirt in the gap, deterioration of machining fluid, the formation of burns at the work piece, deposits of machining debris, obstruction of the cutting kerf, etc.

The HS-WECDM control unit monitors the feed speed and detect the slowing-down and stopping of the cutting process, or measures the process signals and derives anomalous cutting conditions. Some HS-WECDM adopt counteractive measures to solve such jamming, and try to finish the current machining. The provisions includes, for instance, inverting the feeding direction and returning along the path for a fixed distance, while monitoring the process conditions, and then returning to the foremost cutting position.

However, it is not always possible to solve a problem occurring while cutting by means of automatic cycles, for instance, if the already cut kerf is obstructed and cannot be reopened. Moreover, the risk of wire breaking increases if anomalous cutting condition at the origin of the jamming are not eliminated.

SUMMARY

The first aspect of the present invention is addressed to a high-speed reciprocating wire cutting process in which a wire electrode is transported and precisely guided across a machining area by means of a wire traveling circuit, whereas the cutting process is conducted by repeatedly running the wire electrode in a first direction until a first reciprocation position, stopping and inverting the traveling direction of the wire electrode, running the wire electrode in a second direction until a second reciprocation position, stopping and inverting the traveling direction of the wire electrode, wherein a cutting process interruption sequence is carried out if a cutting process monitoring reveals that the cutting process must be interrupted (is stuck or that there is an increased risk of wire breakage), whereas the cutting process interruption sequence includes to continue the cutting process until the first or the second wire electrode reciprocation position, and to pause or stop said cutting process at the wire reciprocation position.

In a high-speed reciprocating wire cutting process according the invention, a wire electrode is transported and precisely guided across a machining area by means of a wire traveling circuit, whereas the cutting process is conducted by repeatedly: running the wire electrode in a first direction until a first reciprocation position, stopping and inverting the traveling direction of the wire electrode, running the wire electrode in a second direction until a second reciprocation position, stopping and inverting the traveling direction of the wire electrode, wherein a cutting process interruption sequence is carried out if a cutting process monitoring reveals that the cutting process must be interrupted, whereas the cutting process interruption sequence includes to continue the cutting process until the first or the second wire electrode reciprocation position, and to pause or to stop said cutting process at the wire reciprocation position.

According the preferred embodiment of the invention the cutting process is thus monitored to recognize the situations in which the machining process is stuck. If it is determined that the machining process is stuck, a cutting process interruption sequence is executed, in which the cutting process initially continues until the first or the second wire electrode reciprocation position. In other words, the cutting process is not immediately interrupted upon occurrence of a persisting problem revealed by the process monitoring, but is continued for the time needed by the wire circuit to travel the wire electrode to a wire reciprocation position, where the process is either paused in view of restoring the current cutting process or fully stopped.

The following is an example of operations carried out after the interruption. The operator may determine the reason for process pause or stop, and may attempt to resume the cutting process. If he determines that the process cannot be resumed from within the cutting kerf, he may typically decide to restart the entire cutting operation from the start point. In this case, he may attempt to carefully move the machine axis against the cutting direction. If this is not possible, the wire electrode has to be removed from the kerf. The operator separates the wire electrode from the wire drum and draws the wire through the kerf. Now he moves the machine axes to a position in which he carries the wire electrode through the wire traveling circuit and secures the tip of the wire electrode at the wire drum. Lastly he moves the axes to the to the start position. For instance, the operator can resume the current machining from the very begin.

According to another embodiment, the cutting process interruption sequence is preceded by one or more unsticking attempts. Unsticking attempts aim to restore a normal cutting condition, when the process monitoring reveals certain cutting conditions deviate from predetermined limits. If the unsticking attempts are successful, the cutting process interruption sequence is by-passed, and the cutting process is automatically continued to the program end. In prior art it is known that the operator can manually pause/restart a cutting process at any moment, for instance to inspect the progress of the machining, or to solve a trouble with the current machining. According the present invention, one or more unsticking attempts are automatically executed in the course of the cutting process to solve an interference. The user can select the one or more action to be executed within the unsticking attempts.

Preferably, the unsticking attempts includes one or more of the following:
- Persisting at the foremost cutting position,
- Inverting the feeding direction and moving back along the cutting path for a predefined length and/or while monitoring the cutting process parameters, then returning to the foremost cutting position,
- Changing one or more process parameters.

An unsticking attempt includes to persist at the foremost cutting position. Here the unsticking is tried by continuing the HS-WECDM process, at zero feed speed ("stationary" machining). Here the wire circuit, the flushing and the generator parameters may be substantially unchanged.

Unsticking attempts are triggered by the process monitoring, when a predetermined condition is fulfilled. The condition which determines the execution of the unsticking attempts, and the condition which determines the execution of the cutting process interruption sequence may be same or different.

According to a preferred embodiment, the cutting process interruption sequence is executed if the cutting process monitoring finds at least one of the following conditions:
- The instantaneous cutting rate falls below a minimum cutting rate Vsmin,
- The average cutting rate falls below a minimum average cutting rate Vsavg,min,
- The cutting process degenerates,
- The number of unsticking attempts exceeds a predefined value nu,max,
- The number of earlier cutting process interruption sequence exceeds a predefined value ni,max.

The process monitoring includes observing one or more parameters of the cutting process. For instance, an instantaneous cutting rate is compared with a minimum cutting rate Vsmin, and the cutting process interruption sequence is executed if instantaneous cutting rate falls below said minimum cutting rate Vsmin. In this way, the progress of the cutting process at the foremost cutting position is monitored. In the same way an average cutting rate is compared with a minimum average cutting rate Vsavg,min, so that an excessively slow average cutting rate is revealed.

Moreover, the process monitoring continuously surveys the cutting process signals in real time to spot critical conditions. This includes in particular determining the occurrence and frequency of normal pulses, short pulses and open pulses. This serves to avoid damages of the work piece, excessive wearing or breaking of the wire electrode, etc.

Further, the number of unsticking attempts is counted to determine persisting troubles. This may include counting the number of earlier successful or unsuccessful unsticking attempts. It my further include counting the number of unsuccessful unsticking attempts currently triggered by the process monitoring.

Lastly, the process monitoring counts the number of times the cutting process interruption sequence has been induced by the process monitoring.

According to a further embodiment the cutting process interruption sequence includes one of the following:
- Continuing the cutting process with the current wire traveling direction until the first reciprocation position, and stopping said cutting process at the first reciprocation position, or
- Continuing the cutting process with the current wire traveling direction until the first reciprocation position, inverting the wire traveling direction and continuing the cutting process until the second reciprocation position, and stopping said cutting process at the second reciprocation position, or
- Immediately interrupting the cutting process, inverting the wire traveling direction and continuing the cutting process until the second reciprocation position, and stopping said cutting process at the second reciprocation position.

It is thus possible to define how the wire traveling circuit shall behave, in consideration of the particular configuration of the machine or for other reasons. For instance, traditional high-speed reciprocating wire cutting machines 100 have a single wire drum 10, where the wire electrode 1 is simultaneously unwound and wound-up. This makes them simple but limits the quantity of wire available between the reciprocation movements. As said, a high-speed reciprocating wire cutting machine 200 having two separate wire drum units 20,30 can store a plurality of wire electrode layers, so that the available quantity is much larger, the reciprocating interval becomes negligible compared with the cutting time, the autonomy is much higher, etc. Here it may be preferable to interrupt the cutting process at a specific reciprocation position, for instance as shown in FIG. 4, having the left wire drum 21 full of wire and the right wire drum 31 empty. Reason may be a better accessibility of the wire traveling circuit for the replacement of the wire electrode, or because of certain technical provisions which are present only on one side of the wire traveling circuit.

With very high quantity of wire stored on the wire drum it may be an advantage to quickly interrupt the cutting process, and to invert the wire traveling direction at an intermediate position, to attain the designated reciprocation position quickly, and thus save time. In other cases, the cutting process continues with the current wire traveling direction until the first or the second reciprocation direction where it is interrupted.

According to another embodiment, the cutting process interruption sequence further includes issuing a warning message. Preferably, a warning message is issued once the process monitoring encounters a condition for which the cutting process interruption sequence is carried out. The message may be displayed on the control unit of the machine and/or transmitted by email, SMS, signal light, by means of an information exchange protocol (f.i. OPC UA) or other form. The message may comprise more or less detailed information about the condition encountered, but also about the residual distance to be cut or the percentage of work completed. In an embodiment, the user can reply to instruct the machine, by selecting one of the available options on how to behave.

According to another embodiment, the cutting process interruption sequence further includes storing the foremost cutting position. The foremost cutting position is the maximum axis position reached in the course on the cutting process. This position is stored at the time of the interruption in view of later resuming of the cutting process.

According to another embodiment, the cutting process interruption sequence is by-passed or delayed, if it is determined that the residual cutting length is less than a predefined residual cutting length value lleft,min. The last portion of the cutting process is sometimes less stable, for instance due to movements of the work piece to be separated, due to the changing flushing condition, or else. Here the process monitoring may erroneously derive that the process is getting stuck, which is not necessarily true. For this reason, the user may want to skip or to delay the cutting process interruption sequence, if the residual cutting length is less than a predefined residual cutting length value. The residual cutting length is the length of the remaining cut until separation. In this embodiment the user can set a residual cutting length value lleft,min to adopt a different behavior in proximity of the separation point. The residual cutting length includes intermediate residual cutting lengths, which exist if the work piece to be separated comprises more than one part. The residual cutting length and the intermediate residual cutting lengths may be derived from CAD data used for the AM-building process, or learned from an earlier cutting process with same geometry.

By way of example, the user may set a predefined minimum residual cutting length value lleft,min of 0.5 mm. The process monitoring continuously derives the residual cutting length, for instance knowing the axis position at which the first spark has been detected, the current axis position, and the total cutting length. Now, if the instantaneous cutting rate falls below the predetermined minimum cutting rate Vsmin=0.8 mm/s and the residual cutting length is less than 0.5 mm, then the control is set such as to skip unsticking attempts or not to execute a cutting process interruption sequence, or to delay these measures.

Moreover, the cutting process may continue using reduced cutting parameters in proximity of the separation of the work piece.

Preferably, default settings are predetermined for the type and number of unsticking attempts, and/or for the conditions which determine the execution of a cutting process interruption sequence, and/or for the cutting process interruption sequence itself.

By automatically interrupting the cutting process at the wire reciprocation position in an exemplary machine 200 having wire drum units 20 and 30, a very little amount of wire electrode is left at the wire drum 31 at one side of the wire traveling circuit, whereas most of the wire is stored at the wire drum 21 at the other end of the wire traveling circuit. This is of advantage in view of the restoring of the cutting process, which has been exemplarily illustrated in relation with claim 1.

Moreover, by automatically interrupting the cutting process at the wire reciprocation position, wasting of electrode wire is avoided or at least reduced. In particular, if the wire electrode is not excessively worn or damaged by the cutting process, the same wire electrode can be remounted on the wire traveling circuit and reused. Moreover, the fact that the wire electrode 1 is already fully wound at one drum unit 20 or 30 (or, fully wound at one side of the single drum unit 10) is very practical for the discharging operation, when it is time to replace the wire electrode.

According to another embodiment, the cutting process is stopped at a wire reciprocation position whereby a small amount of wire electrode is stored on a first wire drum, and a large amount of wire electrode is stored on a second wire drum, wherein the wire electrode is automatically separated at the first drum, and that the wire electrode is automatically removed from the kerf by inverting the wire traveling direction.

This embodiment provides an additional automation feature to disburden the operator. Here a short section of wire electrode remains on a wire drum and in the wire traveling circuit when the wire reciprocation position is reached. The tip of the short section of wire electrode which is fixed at the drum is now detached. For instance, the tip is held by means preloaded spring, which is electromagnetically activated to open. Now the wire electrode is removed from the drum and through the kerf, by inverting the wire traveling direction. In this way the machine axes of the HS-WECDM can be moved freely. Preferably the withdrawal of the wire is monitored, to be sure that it was successful, before any further operation is started.

Accordingly, when the wire is successfully removed from the kerf, the machine axis are optionally moved to a start position or to a position suitable for inserting the wire electrode in the wire traveling circuit.

Other features are inherent in the methods and products disclosed or will become apparent to those skilled in the art from the following detailed description of embodiments and accompanying drawings.

DESCRIPTION OF DRAWINGS

Preferred embodiments of the invention will now be detailed with reference to the attached drawings, which illustrate the following.

DESCRIPTION OF THE PREFERRED EMBODIMENTS

Figure 1:
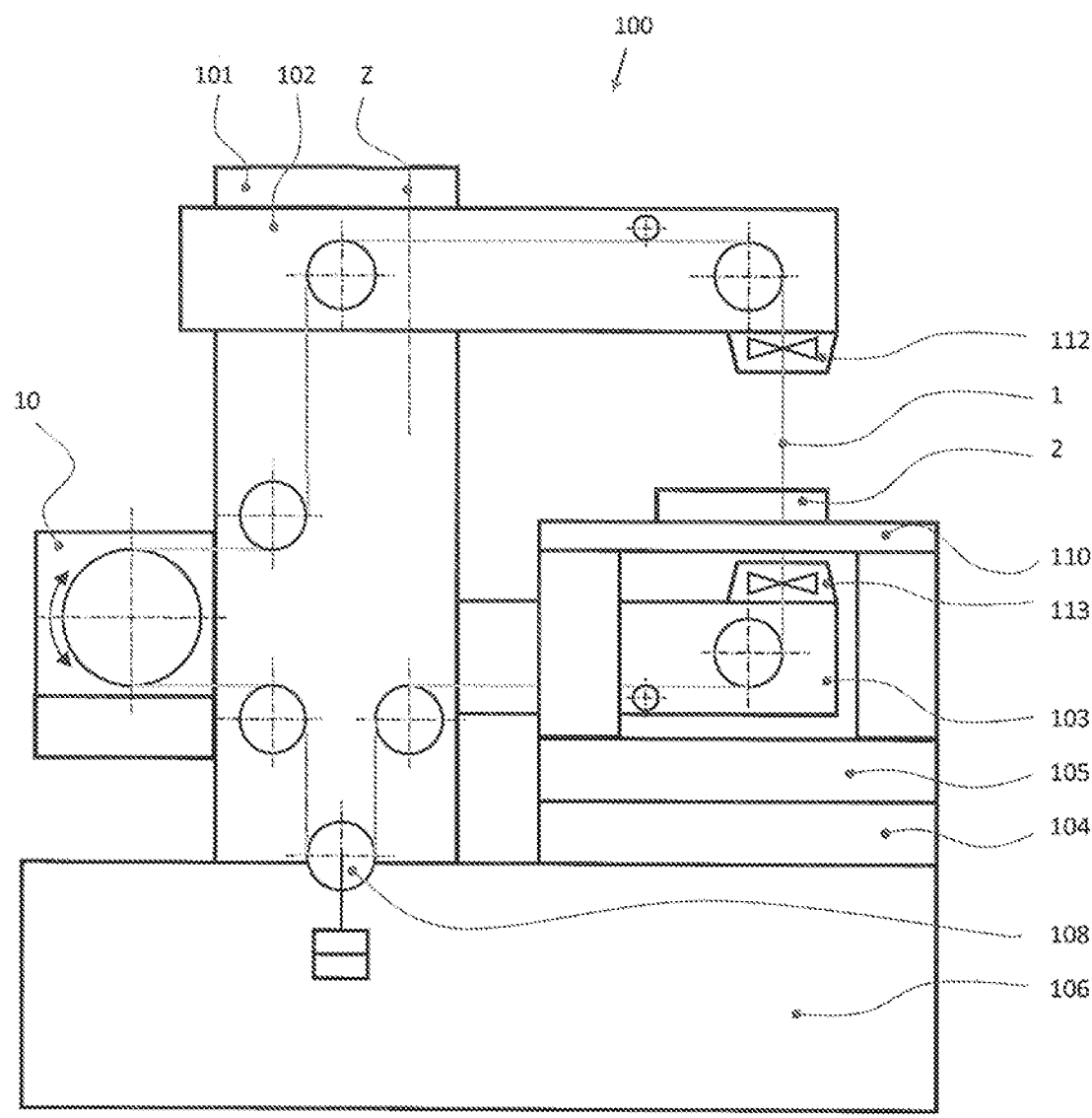
FIG. 1 High-speed reciprocating wire cutting machine.

FIG. 1 shows an exemplary high-speed reciprocating wire cutting machine 100, comprising a base 106, with a column 101 mounted on it. A traverse 102 is mounted at column 101 on a Z-slide, represented by the chain line Z, so that an upper wire guiding head 112 can be positioned vertically. A lower wire guiding arm 103 bearing a lower wire guiding head 113 is fixedly mounted at the column 101. An X-slide 104 a Y-slide 105 and a table 110 are mounted in series on the base 106 so that a work piece 2 mounted on table 110 can be moved in the X/Y-plane.

Figure 2:
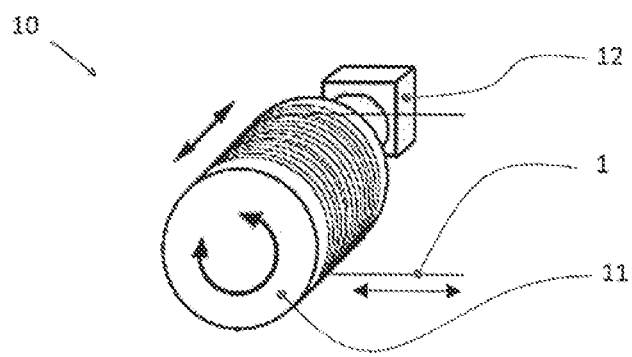
FIG. 2 Wire drum unit of the machine shown in FIG. 1.

A reciprocating wire traveling circuit includes a wire drum unit 10 and a number of rollers by which the wire electrode 1 is made to travel through the machining area. The wire traveling circuit includes a wire-tensioning unit, which in the illustrated case is a simple weight loaded roller 108. FIG. 2 is a simplified spatial view of the wire drum unit 10, which comprises the wire drum 11 and a wire drum motor 12. The wire drum 12 is coupled with the wire drum 11 by means of a first transmission (not shown), which rotates the drum, and a second transmission (not shown), which converts the rotatory motion in a translator motion to translate the drum. Rotation and translation are thus synchronous.

For example, the wire electrode 1 is loaded on the wire drum unit as follows: One end section of the wire electrode 1 is fixed at one side of the wire drum 11, is set on the rollers and is made to travel through the machining area, then is made to come back to the wire drum 11 where it is wound many times on the wire drum on a single layer to fill the drum. The second end section of the wire electrode 1 is fixed at the second side of the wire drum 11. In operation, the wire is unspooled at one side of the wire drum 11 and simultaneously recoiled at the other side, after passing through the machining area. Here the capacity of the wire drum 11 is limited by its diameter, by its length, and by the fact that a single wire layer is spooled on the wire drum.

Figure 3:
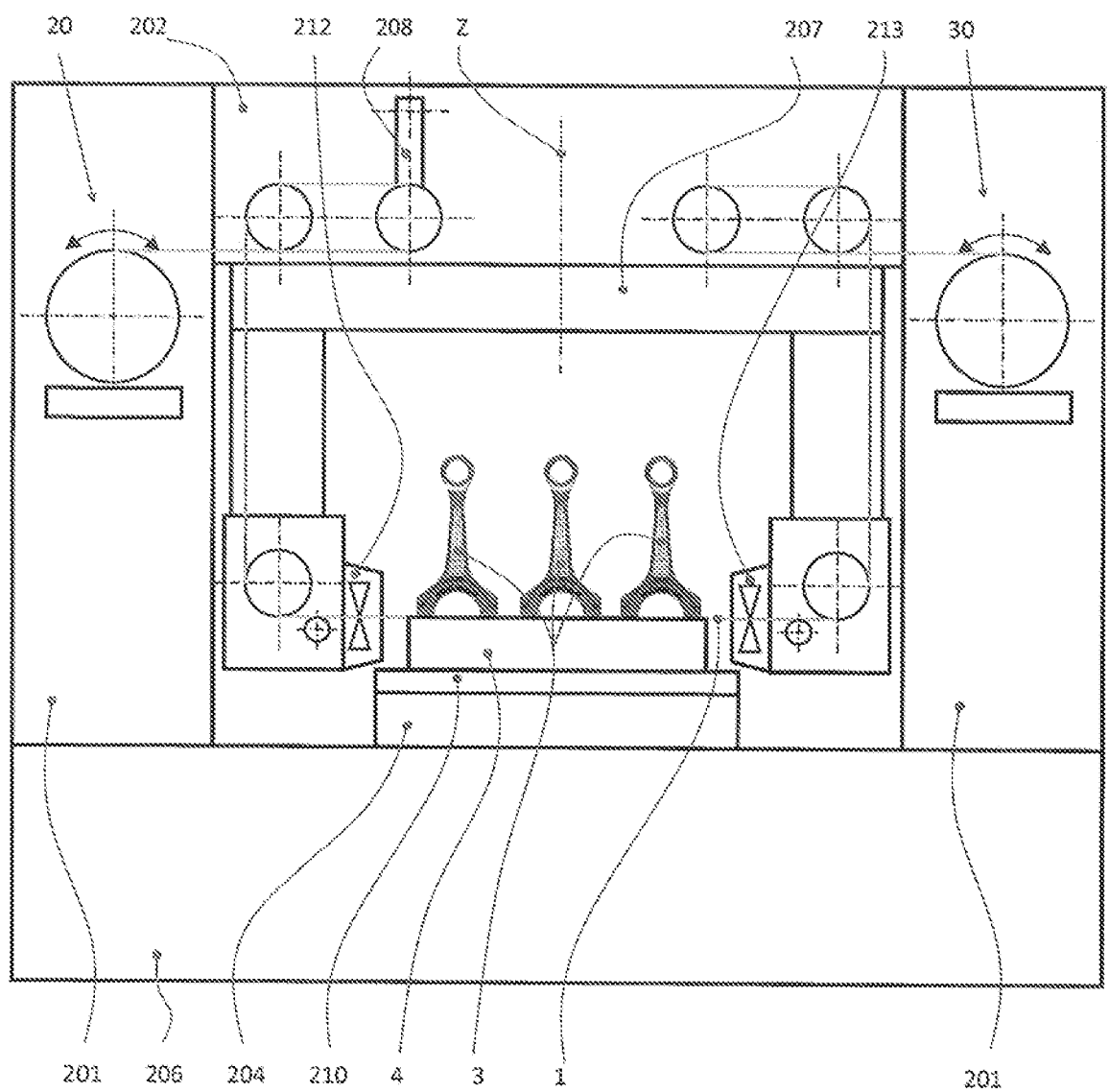
FIG. 3 A high-speed reciprocating wire cutting machine.

FIG. 3 shows another exemplary high-speed reciprocating wire cutting machine. This exemplary machine 200 has a horizontal wire electrode setup, whereas the machine 100 shown in FIG. 1 has the conventional vertical wire electrode setup. The machine 200 comprises a base 206 and a left- and a right column 201 mounted on it. A traverse 202 is mounted between the columns 201. A wire guiding frame 207 bearing a left and a right wire guiding head 212, 213 is mounted at the traverse 202 on a Z-slide, represented by the chain line Z, so that the two guiding heads can be positioned vertically.

A work piece is mounted on a table 210, and said table 210 is mounted on an X-slide 204, so that a work piece can be translated horizontally. Here the work piece is a baseplate 4 with additively manufactured metal parts 3 built on it. The AM-parts are separated from the baseplate by means of a high-speed reciprocating wire cutting process.

Moreover, the machine illustrated in FIG. 3 comprises two wire drum unit 20, 30. In contrast to the single wire drum unit 10 illustrated with reference to FIG. 2, which simultaneously unwinds and rewinds the wire electrode, the wire drum units 20, 30 do either unwind or rewind during a single wire reciprocation cycle. This means that the wire electrode can be store in multiple wire layers by separate control of the rotation and translation of the drum units 20, 30, so that the capacity of the wire drums is considerably increased. The wire electrode is tensioned by controlling the rotation speed of the wire drum units 20 and 30. The tension is monitored by means of dancer roll 208 including a transducer (not shown) which provides a feedback signal to adjust unwinding speed and/or rewinding speed.

Figure 4:
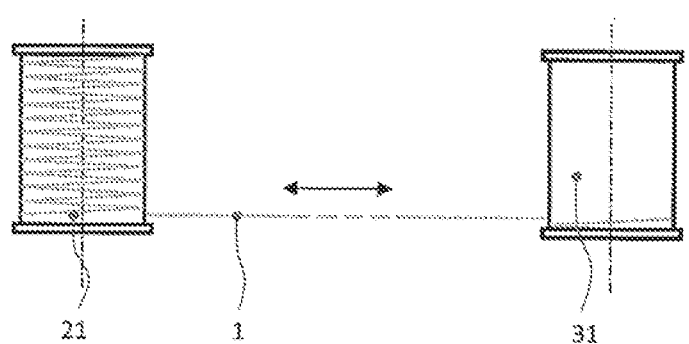
FIG. 4 Wire drums of the machine shown in FIG. 3.

In a machine 200 having two wire drums 21, 31, at the wire reciprocation position one drum is full whereas the other one is empty, as shown in FIG. 4.

As mentioned introductorily, in the course of a cutting process a condition may occur in which the machining is not completed for some reason. Sometimes the wire electrode must be removed from the kerf, to restore or terminate the machining. For instance, it may occur that the cutting kerf is obstructed, that the machining is stuck, that retraction along the cutting path is not possible (kerf closed, short circuit), and/or that there is a risk of wire break or that wire is at the wear limit and must be replaced.

As is well known, installing or replacing the wire electrode in a high-speed reciprocating wire cutting machine is a tedious and time-consuming task. The present invention aims to facilitate this task.

For the avoidance of doubt, it is anticipated that the provisions of the invention apply to both types of machine, the high-speed reciprocating wire cutting machine having an individual wire drum unit 10, and the machines having two wire drum units 20, 30.

The invention claimed is:

1. A high-speed reciprocating wire cutting process in which a wire electrode is transported and precisely guided across a machining area by means of a wire traveling circuit, comprising wherein the cutting process is conducted by repeatedly:
running the wire electrode in a first direction until a first reciprocation position,
stopping and inverting the traveling direction of the wire electrode,
running the wire electrode in a second direction until a second reciprocation position,
stopping and inverting the traveling direction of the wire electrode, wherein
a cutting process interruption sequence is carried out if a cutting process monitoring reveals that the cutting process must be interrupted, whereas the cutting process interruption sequence includes to continue the cutting process until the first or the second wire electrode reciprocation position, and to pause or to stop said cutting process at the wire reciprocation position.

2. A high-speed wire cutting process according to claim 1, wherein the cutting process interruption sequence is preceded by one or more unsticking attempts.

3. A high-speed wire cutting process according to claim 2, wherein the unsticking attempts includes one or more of the following:
   a. Persisting at the foremost cutting position,
   b. Inverting the feeding direction and moving back along the cutting path for a predefined length and/or while monitoring the cutting process parameters, then returning to the foremost cutting position,
   c. Changing one or more process parameter.

4. A high-speed wire cutting process according to claim 3, wherein the cutting process interruption sequence is executed if the cutting process monitoring finds at least one of the following conditions:
   a. The instantaneous cutting rate falls below a minimum cutting rate $V_{smin}$,
   b. The average cutting rate falls below a minimum average cutting rate $V_{savg,min}$,
   c. The cutting process degenerates,
   d. The number of unsticking attempts exceeds a predefined value $n_{u,max}$, and
   e. The number of earlier cutting process interruption sequence exceeds a predefined value $n_{i,max}$.

5. A high-speed wire cutting process according to claim 4, wherein the cutting process interruption sequence includes one of the following:
   a. Continuing the cutting process with the current wire traveling direction until the first reciprocation position, and stopping said cutting process at the first reciprocation position, or
   b. Continuing the cutting process with the current wire traveling direction until the first reciprocation position, inverting the wire traveling direction and continuing the cutting process until the second reciprocation position, and stopping said cutting process at the second reciprocation position, or
   c. Immediately interrupting the cutting process, inverting the wire traveling direction and continuing the cutting process until the second reciprocation position, and stopping said cutting process at the second reciprocation position.

6. A high-speed wire cutting process according to claim 5, wherein the cutting process interruption sequence further includes issuing a warning message.

7. A high-speed wire cutting process according to claim 6, wherein the cutting process interruption sequence further includes storing the foremost cutting position.

8. A high-speed wire cutting process according to claim 7, wherein the cutting process interruption sequence is bypassed or delayed, if it is determined that the residual cutting length is less than a predefined residual cutting length value $left,min$.

9. A high-speed wire cutting process according to claim 1, wherein the cutting process is stopped at a wire reciprocation position whereby a small amount of wire electrode is stored on a first wire drum, and a large amount of wire electrode is stored on a second wire drum, wherein the wire electrode is automatically separated at the first drum, and that the wire is automatically removed from the kerf by inverting the wire traveling direction.

10. A control unit configured to control the process according to claim 1.

11. A control unit according to claim 10, wherein the control unit is configured to control the cutting process interruption sequence and/or the unsticking attempt.

12. A high-speed wire electrochemical-discharge machine tool comprising a reciprocating wire traveling circuit includes at least one wire drum unit and a number of rollers by which the wire electrode is made to travel through the machining area and a control unit according to claim 11.

13. A high-speed wire electrochemical-discharge machine tool comprising a reciprocating wire traveling circuit includes at least one wire drum unit and a number of rollers by which the wire electrode is made to travel through the machining area and a control unit according to claim 10.

* * * * *